June 24, 1952 G. E. HUBE 2,601,292
FISH SKINNING MACHINE
Filed March 20, 1946 4 Sheets-Sheet 3

Inventor,
G. E. HUBE
By Semmes, Keegin, Beale & Semmes Attys.

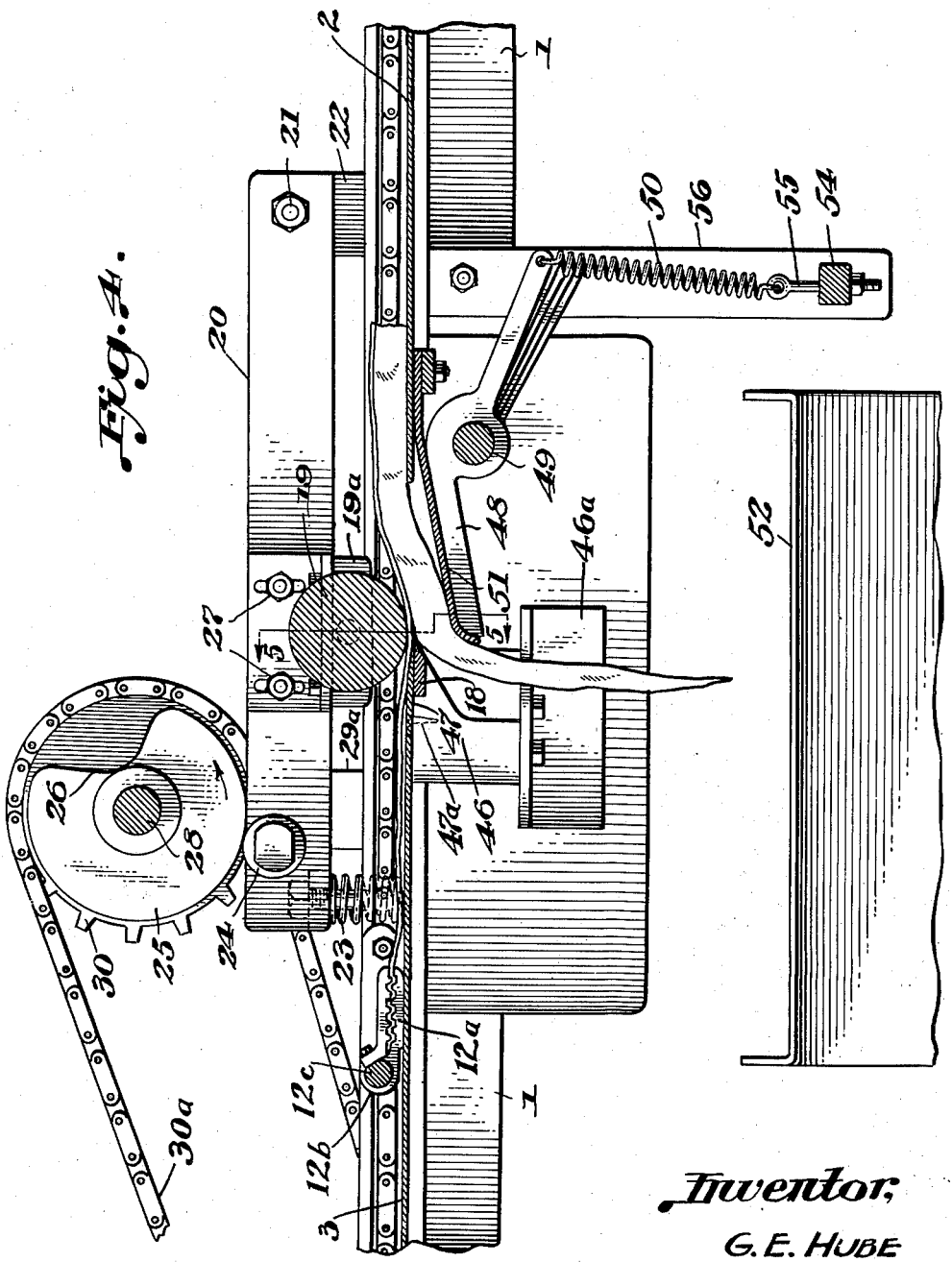

Patented June 24, 1952

2,601,292

UNITED STATES PATENT OFFICE 2,601,292

FISH SKINNING MACHINE

Gottfried Erwin Hube, Bellingham, Wash., assignor, by mesne assignments, to Pacific Laboratories, Inc., Bellingham, Wash., a corporation of Washington Application March 20, 1946, Serial No. 655,647

12 Claims. (Cl. 17—2)

This invention relates to a slicing machine and particularly to a slicing machine adapted to the skinning of fish.

Heretofore, slicing machines of the type described in this invention usually relied upon friction between the object being sliced and an endless belt carrying the object to the actual slicing mechanism. Also some machines employ suction to hold the object against the carrying member while it is being drawn past a moving knife. In such machines there is no strong positive grip on the object as it passes the knife; consequently, uniform slices could not be obtained from irregular objects.

Sometimes it is desirable to cut a strip of varying thickness from the object. Such is the case in the skinning of fish where the skin along the dorsal and ventral surfaces is thicker than along the lateral sides of the fish. The prior machines were not adapted to cutting a strip of a thickness varying according to a desired plan.

It is an object of this invention to provide an apparatus for slicing an irregular yieldable object.

It is also an object of this invention to provide an apparatus for skinning fish.

Still another object of this invention is to provide means for cutting slices in which the thickness of a slice varies according to a prearranged plan.

A further object of this invention is to provide a slicing machine for slicing irregular, yieldable objects in which a uniform slice will be obtained.

With these and other objects in mind, this invention resides in a machine which forcefully grips a yieldable object and draws it past a moving knife which is in fixed relation to a guiding means against which the object is pressed.

In the drawings:

Figure 4 is a sectional view taken on line 4—4 in Figure 2, showing the arrangement of the knife in respect to the guide roll.

As an illustration of the principles of this invention, a fish skinning machine embodying the same will be described.

Figure 1:
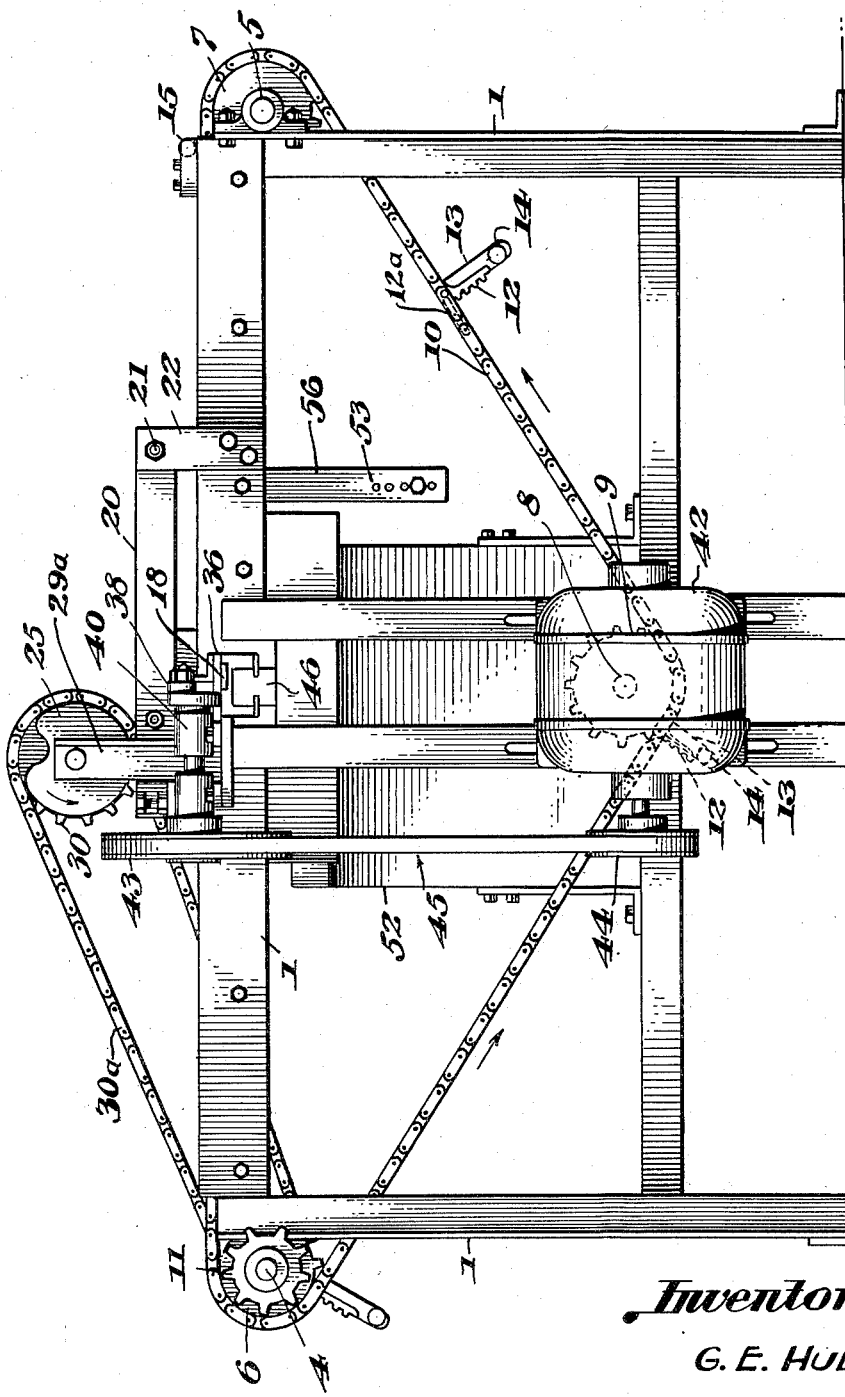
Figure 1 is a side elevation of the machine.
Figure 2:
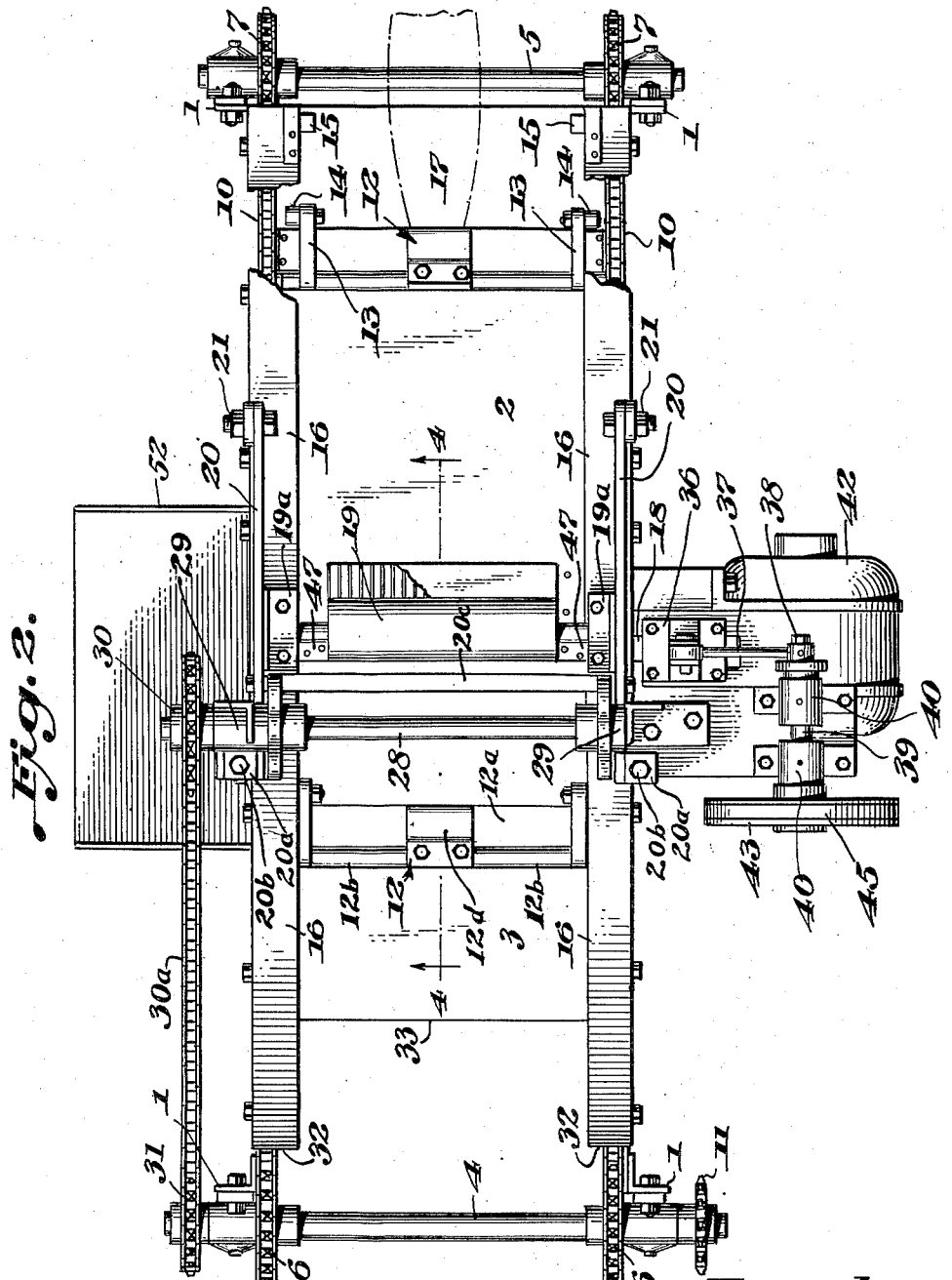
Figure 2 is a plan view of the machine with portions broken away to show the construction.

Referring to Figure 1 the machine of this invention comprises a frame 1 of a tablelike structure which may be constructed principally of angle iron stock with table surfaces 2 and 3 at the upper portion of the frame. The table surfaces are best shown in Figure 2. Slightly below the table surfaces 2 and 3 and at both ends of the frame, shafts 4 and 5 are mounted for rotation in bearings which are attached to the frame. Keyed to the shafts 4 and 5 are pairs of spaced sprockets 6 and 7. Riding on shaft 8 located near the lower central part of the frame are a pair of spaced sprockets 9. A pair of parallel endless chains 10 pass over the pairs of sprockets 6, 7 and 9 and cooperate to provide an endless conveyor for moving objects to be sliced along the tables 2 and 3. Sprockets 6, fixed on drive shaft 4, serve to move the chains in a counter-clockwise direction through their path of travel while sprockets 7 and 9 serve as idlers for guiding the chain in its path of movement. The location of shafts 4 and 5 and the size of sprockets 6 and 7 are such that the chains 10 ride smoothly along the outer edges of the table surfaces 2 and 3.

Carried by one end of shaft 4 is a sprocket 11 through which power required to move the chains 10 about the frame is delivered to the shaft. Power for driving sprocket 11 may be obtained either from a motor (not shown) mounted upon the frame or from some outside source.

Extending between the spaced chains 10 at regular intervals along their length are the lower jaw members 12a of clamps 12. The lower jaw members have upturned end flanges provided with spaced openings to receive the inner ends of pins extending through the openings in the ends of opposite links of the chains 10. Thus the lower jaws are fixed with the links of the chains. At its leading edge the lower jaw member is provided with two aligned horizontal shaft receiving sockets 12b through which a shaft 12c extends. Intermediate the sockets 12b, an upper jaw 12d is fixed to shaft 12c for movement with said shaft. Suitable torsion springs (not shown) may be provided to urge the jaws to open position. Rigidly affixed to both ends of the shaft 12c, and consequently rigidly connected to the upper jaw 12d, are lever arms 13 with rollers 14 carried by the free ends thereof and extending toward the sides of the machine.

At each side of the upper portion of the frame are inwardly extending flanges 15 which are slightly spaced above the surfaces of tables 2 and 3. These flanges serve as tracks for engagement by rollers 14 on the ends of the lever arms 13 of the clamps 12. Each of the tracks 16 are provided with rollers 15, as clearly shown in Figs. 1, 2 and 3 of the drawings, which are positioned slightly above and adjacent the sprockets 7. As the conveyor chains 10 pass over the shaft 5, the arms 13 engage the rollers 15 to cause the jaws 12 to close. Just as the jaws of the clamp 12 are about to close, an operator standing at the feed end of the machine inserts a split fish between the jaws of the clamp with the skin side of the fish up. After the clamp moves past the inwardly extending rollers 15, it is maintained closed by engagement of the rollers 14 with the under surfaces of the tracks 16. Thus the tail of the fish is securely gripped between clamps throughout the travel of the fish over the tables 2 and 3, past the skinning knife 18.

As best illustrated in Figure 4 of the drawings, a slicing knife 18 is positioned beneath the table 3 at the edge of said table toward which the fish is moved by the conveyor. Directly above the knife is located the guide roll 19 for adjusting the thickness of the skin, or slice removed from the fish or other article moved past the knife.

Obviously the space between the knife 18 and the roller 19 is insufficient to enable the clamp 12 to be moved between the same. In order to enable the clamp to be moved between the knife 18 and the roller 19, the present invention provides means for raising the roller 19 sufficiently to enable the clamps to be moved past the knife and roller without engaging either of them. In order to raise the roller 19 said guide roll 19 is mounted for rotation in bearings 19a supported by arms 20, which are pivotally mounted on bolts 21 carried by lugs 22 extending upwardly from each side of the frame. Ears 20a are provided at the free ends of arms 20 and are apertured to receive bolts 20b which are secured in the frame 1 to serve as guides for springs 23 positioned between the ears and the frame. Arms 20 are secured together by means of a tie and spacing rod 20c extending between the same. Adjacent the free ends of the arms 20 are mounted rollers 24. These rollers are adapted to engage with the peripheral surfaces of cams 25 against which the rollers 24 are urged by the springs 23. Cams 25 are carried by a shaft 28 which is mounted in suitable bearings 29 supported by upright members 29a extending upwardly from the frame 1.

It will be noted that the engagement between the rollers 24 and the periphery of cams 25 limits the upward movement of the arms 20 and consequently the upper position of the roller 19. The surface of cam 25 is provided with an indentation 26 which permits the arms 20 and the roller 19 carried thereby to be raised a sufficient distance to enable the clamps 12 to pass under the roller 19. In this connection it will be noted that the shaft 28 which carries the cam 25 is driven by a sprocket 30 which is connected by an endless chain 30a with a sprocket 31 fixed on shaft 4. Thus, cams 25 are driven in timed relation with the movement of the chains 10. With this construction the cams 25 are rotated at such a speed that every time one of the clamps 12 is about to pass under the rollers 19, the notches 26 of cams 25 are brought into engagement with the rollers 24 to permit the springs 23 to lift the roller 19 to clear the clamp 12.

After the clamp 12 has moved past the roller 19, the latter is positively lowered by the cam 25 so that its surface will be spaced a predetermined distance from the knife 18. In this position the roller 19 presses the fish downwardly so that only the skin or a thin slice of the same is permitted to pass between the roller 19 and the knife 18. The roller is maintained in this lowered position until the next clamp carried by the chain is about to move past the roller 19. Adjusting screws 27 fix the position of bearings 19a and thereby provide means to adjust the distance between the knife and the lowered roller.

The actual slicing of the fish is accomplished by knife 18 which is located directly beneath guide roll 19 and at a level slightly below the level of table surfaces 2 and 3. The knife may be either of the continuous band type moving in one direction or of the oscillating type illustrated in the drawings.

Knife 18 is mounted in a bed in the upper surface of a casting 46 which extends transversely of the machine beneath the table 3. Casting 46 is supported on brackets 46a and is cut away intermediate its ends to provide space for fish to move under the knife 18. A keeper or gib 47 is mounted in position by screws 47a and serves to retain the knife 18 within its bed.

Figure 3:
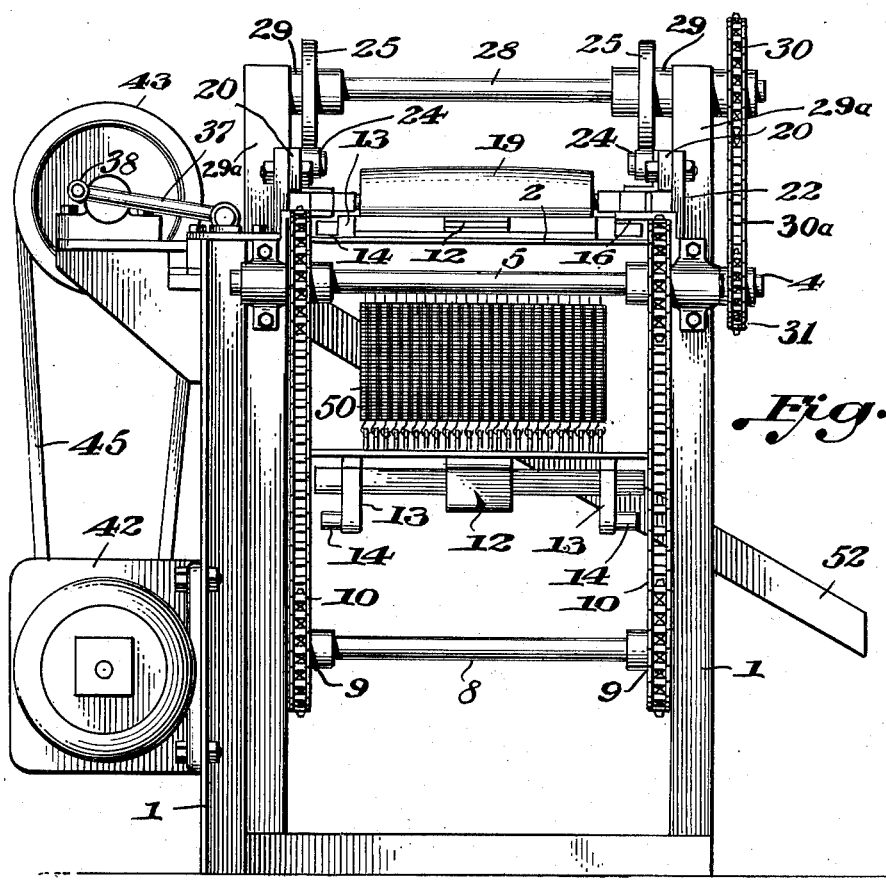
Figure 3 is an end view of the machine looking at the right-hand end of the machine in Figures 1 and 2.

Casting 46 extends beyond the side of the machine and is shaped to provide a guide track on which is slidably mounted a cross head 36 to which one end of knife 18 is secured. As shown in Figures 1 and 3 the cross head has depending sides which embrace the guide track and which have inwardly extending flanges projecting into longitudinal slots in the sides of said track.

Cross head 36 is reciprocated by a connecting rod 37 the other end of which is carried by a crank pin eccentrically mounted relative to shaft 39 and driven by said shaft. As illustrated in the drawings, shaft 39 is rotatably mounted in bearings 40 suitably supported on the frame of the machine. Shaft 39 is driven by electric motor 42, the power from said motor being transmitted from a pulley 44 on the motor shaft through a V-belt 45 to a pulley 43 fixed on shaft 39.

The above described structure serves to oscillate the knife 18 to effectively slice the skin or desired portion from the body of the fish.

In order to maintain the skin of the fish in contact with the guide roller 19 throughout the width of said roller the present invention provides a simple mechanism. As shown in Figure 4, a plurality of fingers in the form of levers 48 closely spaced and arranged parallel to the direction of movement of the fish are located directly under the knife 18. The levers 48 are positioned at regular intervals across the width of the table and are pivotally mounted on a transversely extending shaft 49. At one end of each of the levers 48 there is connected one end of a coil spring 50, the other end of which is secured in the eye of an eyebolt 55 which extends through a transverse beam 54. The eyebolts 55 are secured in suitable openings in the beam 54 by means of nuts threaded mounted on the lower ends of the bolts and may thereby be vertically adjusted to vary the tension on the individual springs 50.

Beam 54 extends between two downwardly extending supports 56 carried by the frame of the machine and may be fixed in said supports at various elevations by providing said supports with a plurality of vertically spaced openings 53 to receive bolts or other securing means extending through said openings into the beam 54. Thus vertical adjustment of the position of beam 54 may be effected.

Instead of the springs 50, hydraulic or pneumatic means may be provided for exerting the required downward pressure on the ends of the levers 48.

An important characteristic of the fingers is that they are individually actuated and each finger is free to move without affecting any other. When a yieldable, irregular object such as a half of a fish is drawn by a clamp 12 between the fingers and the guide roll, the fingers press the object against the guide roll making the upper surface of the object conform to the shape of the guide roll. A flexible sheet or apron 51 overlies the fingers to afford a smoother continuous pressure against the object. The sheet is preferably made of neoprene but, of course, can be made of any other similar flexible material.

Figure 5:
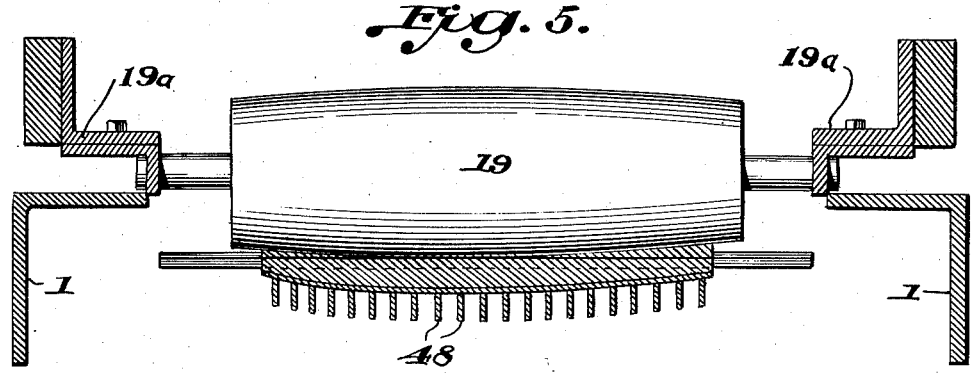
Figure 5 is a sectional view taken on line 5—5 in Figure 4, illustrating the operation of the fingers during the slicing operation.

Referring to Figure 5 it will be seen that the fingers press the object flat against the surface of the guide roll. If it is desired that a strip of varying thickness be cut from the object fed through the machine the guide roll may be crowned or tapered, as shown greatly exaggerated in this drawing. If a fish, for example, is slit along the dorsal-ventral axis, the skin along the lateral line is thinner than that along both the dorsal and ventral surfaces. Consequently, a slice slightly thicker at the edges than at the center should be cut and for this purpose the guide roll should be tapered, as shown in Figure 5. Proper centering of the object necessary to make the tapered roll effective is assured by the narrow gripping area of clamp 12. Of course, slices of widely varying thickness can be obtained merely by varying the diameter of the guide roll at different sections along its axis.

In operating a machine constructed as hereinbefore described, power is applied to the shaft 4 which causes the conveyor to move over the tables 2 and 3 and the roller 19 to be periodically raised and lowered to permit the clamps 12 to pass between said roller and the knife 18. The motor 42 is then started to effect reciprocation or oscillation of the knife 18. With the conveyor mechanism and the knife in operation, an operator then feeds split fish with the skin side up into the machine by placing the tails of said fish between the jaws of the open clamps as they pass over the shaft 5 or before the arms 13 engage the closing rollers 15. Just before the clamps 12 reach the guide roll 19, said roll is raised to permit the clamp to pass under the same. Immediately after the clamp has been moved beyond the roll 19, the latter is lowered to press the under flesh side of the split fish onto the edge of the oscillating knife 18. As the clamp 12 continues to move forward, it drags with it the skin severed from the flesh portion of the fish, as clearly shown in Figure 4 of the drawings, and the flesh portion of the fish which passes under the knife drops down and through the machine into a chute 52 which feeds the same to a suitable point of delivery.

By providing the fingers or levers 48 beneath the roll 19, the flesh is pressed upwardly so that the upper surface of the skin is maintained in contact with the roll 19 throughout the width of said roll. This insures the knife engaging the fish at a point so that the skin is completely removed from the flesh portion thereof.

As the clamp 12, gripping the partially severed skin of the fish, progresses across the table 3, the severing action is continued until the skin is completely removed from the fish. The table 3 and the guide track 16 are made of such lengths that by the time the roller 14 on the ends of the arms 13 reach the ends 32 of the tracks 16 the skin will be completely severed and will have been pulled far enough over the end 33 of table 3 so that when the clamps 12 are opened the skin will drop down into a receptacle or chute for collection. By shortening the table 3, as indicated in Figure 2, the skin will be completely supported by the clamp by the time the clamp opens so that the weight of the skin will effect its removal from the clamp.

As each of the clamps passes over the shaft 5 or just before the rollers 14 engage the ends of the tracks 16 to close the clamps, another fish to be skinned is inserted in the clamp. By operating the machine at an optimum speed, a large number of fish may be skinned during the course of a working day.

While in the machine illustrated in the accompanying drawings and described above, the fish is placed between the jaws of the clamps 12 with the skin side up, it is, of course, within the contemplation of the present invention to construct the machine in an inverted manner with the knife and pressing fingers positioned above the roller. With this construction, the skin will pass beneath the knife and the flesh portion of the fish will pass over the knife.

From the foregoing description, it will be appreciated that the present invention provides a fish skinning machine in which a fish to be skinned is firmly gripped by a clamp carried by a conveyor for moving the fish by a skin removing knife. It will also be noted that the present invention provides means for forcing the entire surface of the skin against the surface of a guide roll so that the skin may be completely removed from the fish. In this connection it should be observed that by tapering or otherwise shaping the surface of the roll 19, the skin of a fish can be completely removed even though the skin is thick at the dorsal and ventral portions thereof. The apparatus operates on fish which have been split in the central longitudinal dorsal-ventral plane into halves, each fish half being defined by a flat flesh side and a laterally curved convex skin side. Pressure is applied to the skin side of the fish halves in such manner as to compensate for increased thickness of the skin at its dorsal and ventral portions, and to thus urge the interface between the skin and flesh into a substantially straight line with the flesh below the skin. With the fish halves pressed into this condition, the knife is run across the interface to separate the skin and flesh, and the skin is pulled past the knife whereby the weight of the flesh and the tensile force on the skin act in different directions to aid in pulling the skin and flesh apart after the initial incision of the knife. Apart from the foregoing, the machine as hereinbefore described provides means for avoiding damage to the knife by the fish clamping means carried by the conveyor.

While in the foregoing description reference has been made to the removing of the skin from fish, it should be fully understood that the machine of the present invention may be employed for cutting slices or strips from fish or other yieldable, irregular objects. The feature of the present invention relating to the removal of fish skins which are thicker at the dorsal and ventral portions will also be useful in the removal of slices of non-uniform thickness from other yieldable, irregular objects. Also the pressure fingers hereinbefore described for maintaining the surface of the skin in contact with the guide roll throughout its width will be found desirable in connection with the slicing of other yieldable, irregular objects.

While specific constructional details have been referred to in order to fully describe the present invention, it is to be understood that the details of construction may be varied without departing from the scope of the present invention.

I claim:

1. Apparatus for separating the flesh from the skin of fish which are split in the central longitudinal dorsal-ventral plane, comprising a frame having receiving and discharging ends, a rotatable roller and a knife mounted on said frame, said roller having a smooth peripheral surface and said knife having a cutting edge presented tangentially to said surface and spaced therefrom a distance only slightly greater than the thickness of the skin of the fish, conveying means for moving the fish between said receiving and discharging ends and past said knife including gripping members to clamp the tails of successive fish and pull them tail end first past said knife with the skin side of the fish presented toward said roller, means operable in timed relation with the movement of said gripping members to close them on a fish tail prior to their arrival at said knife and to open them for releasing the fish tail and skin after they have passed said knife, and a plurality of fingers positioned along the length of said roller to engage and press the fish against said roller immediately in advance of said knife, and means for mounting said fingers for independent yielding movement governed by the thickness of that portion of the fish which they contact.

2. A construction in accordance with claim 1 wherein the surface of said roller is crowned.

3. A construction in accordance with claim 1 wherein the fish engaging surfaces of said fingers are covered with a flexible apron.

4. A construction in accordance with claim 1 wherein means are provided to oscillate said knife in a direction laterally of the direction of movement of said conveying means.

5. Apparatus for separating the flesh from the skin of split fish comprising a frame, a rotatable roller and a knife mounted on said frame, said roller having a smooth peripheral surface and said knife having a cutting edge presented tangentially to said surface and spaced therefrom a distance only slightly greater than the thickness of the skin of the fish, conveying means including gripping members to clamp the tail of the fish and pull it past said knife with the skin presented to the surface of said roller, and a plurality of fingers positioned along the length of said roller adjacent said knife to engage and press the fish against said roller immediately in advance of the edge of said knife, and means for mounting said fingers for independent yielding movement governed by the thickness of that portion of the fish which they contact.

6. Apparatus for separating the flesh from the skin of split fish comprising a frame, a rotatable roller and a knife mounted on said frame, said roller varying in diameter between its center and its ends and having a smooth peripheral surface and said knife having a cutting edge presented tangentially to said surface and spaced therefrom a distance only slightly greater than the thickness of the skin of the fish, conveying means for carrying the fish past said knife with the skin presented to the surface of said roller, and yielding pressing means adjacent said knife to engage and press the fish against said roller immediately in advance of the edge of said knife.

7. Apparatus for separating the flesh from the skin of a split fish comprising a frame, a rotatable roller and a knife mounted on said frame, said roller varying in diameter between its center and its ends and having a smooth peripheral surface and said knife having a cutting edge presented tangentially to said surface and spaced therefrom a distance only slightly greater than the thickness of the skin of the fish, conveying means including gripping members to clamp the tail of the fish and pull it past said knife with the skin presented to the surface of said roller, and a plurality of fingers positioned along the length of said roller adjacent said knife to engage and press the fish against said roller immediately in advance of the edge of said knife, and means for mounting said fingers for independent yielding movement governed by the thickness of that portion of the fish which they contact.

8. A skinning machine comprising a frame, a guide roll on said frame having a smooth peripheral surface and which varies in diameter between its center and its ends, a conveyor for carrying the object to be skinned to and beyond said roller, said conveyor having clamping means for gripping the object to be skinned, a knife mounted on said frame having a cutting edge presented tangentially of said roller, and a plurality of fingers which urge said object against said guide roll, said fingers being mounted adjacent the cutting edge of said knife and for independent yielding movement from and toward said guide roller.

9. A slicing machine comprising a frame having a top table surface, a guide roll mounted on said frame above said surface, a knife mounted on said frame on one side of said guide roll having a cutting edge presented tangentially toward said guide roll, a continuous conveyor chain which is mounted for movement along said table surface toward the other side of said guide roll and said knife, said chain having means thereon for gripping the object to be sliced in order to convey same past said knife, means on said frame adjacent said guide roll and said knife for yieldably urging the object to be sliced against said guide roll, a cam carried by said frame for intermittently displacing said guide roll from said knife to permit passage therebetween of said gripping means on said chain, means on said frame for oscillating the cutting edge of said knife between said urging means and said guide roll, and means for adjusting said guide roll with respect to said knife.

10. A construction in accordance with claim 9 wherein said means for urging the object against the guide roll comprises a plurality of fingers indepndently mounted on said frame.

11. A slicing machine comprising a frame, a guide roll mounted on said frame, an endless chain mounted for movement in said frame for moving the object to be sliced under said guide roll, a plurality of fingers mounted on said frame having engaging ends positioned adjacent to said guide roll to urge the object against said guide roll, springs in said frame acting on said fingers and individually urging them toward said guide roll, and a knife mounted for movement on said frame between said fingers and said guide roll.

12. A slicing machine comprising a frame having a top table surface, a guide roll mounted on said frame above said surface, a knife mounted on said frame on one side of said guide roll having a cutting edge presented tangentially toward said guide roll, a conveyor mounted for movement along said table surface toward the other side of said guide roll and said knife, said conveyor having clamps thereon for gripping the object to be sliced in order to convey same past said knife, a plurality of fingers individually mounted on said frame having engaging ends which press the object against said guide roll while it is being sliced by said knife, means to oscillate said knife between said guide roll and said fingers in a plane generally parallel to the axis of said guide roll, means for adjusting the clearance between said knife and said guide roll, and means operating in timed relationship with the movement of said conveyor to displace said guide roll from said knife in order to pass said clamps.

GOTTFRIED ERWIN HUBE.

REFERENCES CITED

The following references are of record in the file of this patent:

UNITED STATES PATENTS

| Number | Name | Date |
| --- | --- | --- |
| 1,347,237 | Waddington | July 20, 1920 |
| 1,714,355 | Englen et al. | May 21, 1929 |
| 1,911,810 | Cooke | May 30, 1933 |
| 2,173,336 | Lamere et al. | Sept. 19, 1939 |
| 2,215,114 | Baader et al. | Sept. 17, 1940 |
| 2,380,755 | Hendrickson | July 31, 1945 |